US012010752B2

(12) United States Patent
Nair

(10) Patent No.: US 12,010,752 B2
(45) Date of Patent: Jun. 11, 2024

(54) SEPARATION OF DATA AND CONTROL PACKETS OVER NON-ACCESS STRATUM LINKS IN COMMUNICATION SYSTEM

(71) Applicant: Nokia Technologies Oy, Espoo (FI)

(72) Inventor: Suresh Nair, Whippany, NJ (US)

(73) Assignee: NOKIA TECHNOLOGIES OY, Espoo (FI)

(*) Notice: Subject to any disclaimer, the term of this patent is extended or adjusted under 35 U.S.C. 154(b) by 90 days.

(21) Appl. No.: 17/602,326

(22) PCT Filed: Apr. 18, 2019

(86) PCT No.: PCT/US2019/028050
§ 371 (c)(1),
(2) Date: Oct. 8, 2021

(87) PCT Pub. No.: WO2020/214172
PCT Pub. Date: Oct. 22, 2020

(65) Prior Publication Data
US 2022/0201793 A1 Jun. 23, 2022

(51) Int. Cl.
H04W 4/00 (2018.01)
H04W 12/03 (2021.01)
H04W 12/041 (2021.01)
H04W 76/25 (2018.01)

(52) U.S. Cl.
CPC ........... *H04W 76/25* (2018.02); *H04W 12/03* (2021.01); *H04W 12/041* (2021.01)

(58) Field of Classification Search
USPC ................ 370/329, 300, 333, 338, 395, 252
See application file for complete search history.

(56) References Cited

U.S. PATENT DOCUMENTS

| 2016/0286600 | A1 | 9/2016 | Faccin et al. |
| 2018/0124854 | A1 | 5/2018 | Myhre et al. |
| 2019/0037407 | A1 | 1/2019 | Nair et al. |
| 2020/0153875 | A1* | 5/2020 | Karampatsis ....... H04L 65/1016 |

FOREIGN PATENT DOCUMENTS

WO PCT/US2019/028050 7/2019
WO PCT/US2019/028050 10/2021

OTHER PUBLICATIONS

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 16)," TS 23.401, V16.2.0, Mar. 2019, 418 pages.

(Continued)

*Primary Examiner* — Zewdu A Beyen
(74) *Attorney, Agent, or Firm* — Robert P. Michal, Esq.; Carter, DeLuca & Farrell LLP

(57) ABSTRACT

Improved techniques for control plane message management in a communication system are provided. For example, a method comprises transmitting control data over a control plane associated with a communication system using a first access identifier value, and transmitting user data over the control plane using a second access identifier value. The first access identifier value is distinct from the second access identifier value.

30 Claims, 6 Drawing Sheets

(56) References Cited

OTHER PUBLICATIONS

Ericsson, "Discussion on Security for Multiple NAS Connections (KI #1.7)," 3GPP TSG SA WG3 (Security) Meeting #87, S3-171274, May 15-19, 2017, 4 pages.

Ericsson, "New Solution for the Protection of Multiple NAS Connections (KI #1.7)," 3GPP TSG SA WG3 (Security) Meeting #87, S3-171275, May 15-19, 2017, 2 pages.

3GPP, "3rd Generation Partnership Project; Technical Specification Group Services and System Aspects; Security Architecture and Procedures for 5G System (Release 15)," TS 33.501, V15.4.0, Mar. 2019, 187 pages.

3GPP, "3rd Generation Partnership Project; Technical Specification Group Services and System Aspects; System Architecture for the 5G System (5GS); Stage 2 (Release 17)," TS 23.501, V17.2.0, Sep. 2021, 269 pages.

\* cited by examiner

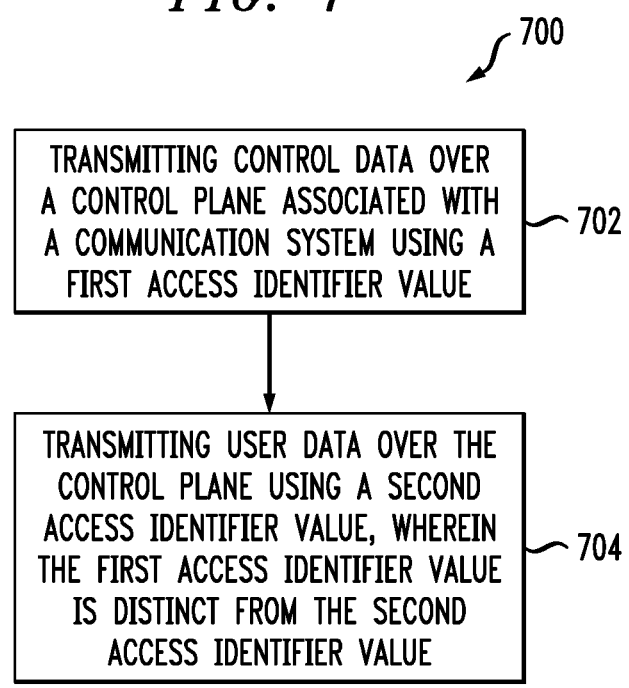

SEPARATION OF DATA AND CONTROL PACKETS OVER NON-ACCESS STRATUM LINKS IN COMMUNICATION SYSTEM

FIELD

The field relates generally to communication systems, and more particularly, but not exclusively, to control plane communications within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V16.0.2, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.4.0, entitled "Technical Specification Group Services and System Aspects; Security Architecture and Procedures for the 5G System," the disclosure of which is incorporated by reference herein in its entirety, further describes security management details associated with a 5G network.

Network performance is an important consideration in any communication system. For example, processing of control plane messages received by the core network from user equipment can have a significant impact on network performance. However, management of such communications presents several challenges in existing 5G approaches.

SUMMARY

Illustrative embodiments provide improved techniques for control plane message management in a communication system.

For example, in one illustrative embodiment, a method comprises transmitting control data over a control plane associated with a communication system using a first access identifier value, and transmitting user data over the control plane using a second access identifier value. The first access identifier value is distinct from the second access identifier value.

In another illustrative embodiment, the method may further comprise: transmitting the control data over the control plane using the first access identifier value for one of a first access type and a second access type; transmitting the control data over the control plane using a third access identifier value for the other of the first access type and the second access type; transmitting the user data over the control plane using the second access identifier value for one of the first access type and the second access type; and transmitting the user data over the control plane using a fourth access identifier value for the other of the first access type and the second access type. The first, second, third and fourth access identifier values are distinct with respect to one another.

In some embodiments, the first access type comprises 3GPP access and the second access type comprises non 3GPP access. Further, in certain embodiments, the control plane comprises a (NAS) non-access stratum link, wherein the first access identifier value and the second access identifier are unique NAS bearer identifier values.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 7 illustrates a control plane message management methodology, according to an illustrative embodiment.

DETAILED DESCRIPTION

Figure 1:
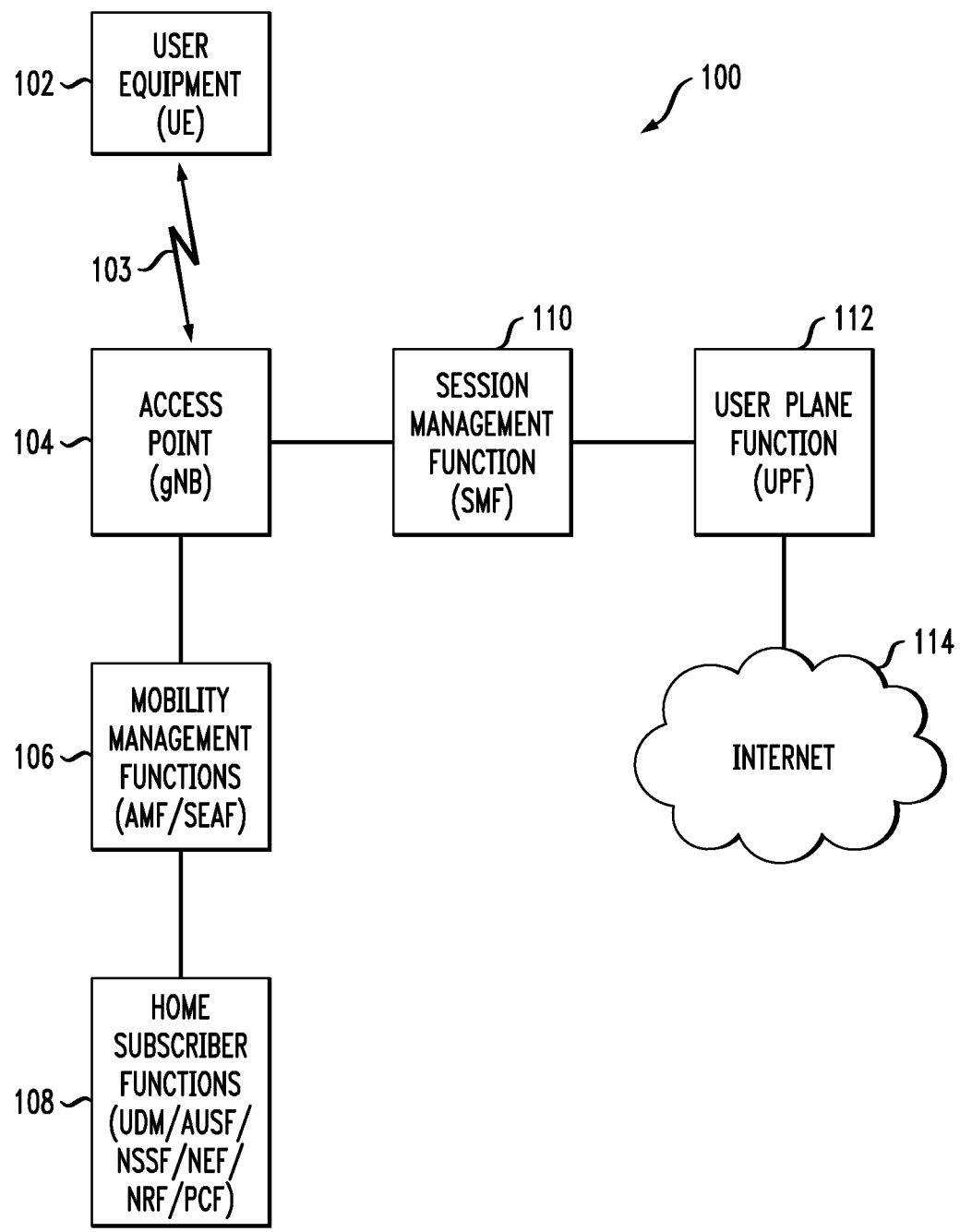
FIG. 1 illustrates a communication system with which one or more illustrative embodiments are implemented.

Embodiments will be illustrated herein in conjunction with example communication systems and associated techniques for providing control plane message management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems. Note that 3GPP stands for 3rd Generation Partnership Project which is a standards organization that develops protocols for mobile telephony and the like.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. For example, 5G Technical Specification (TS) 23.401, V16.2.0, entitled "Technical Specification Group Services and System Aspects; General Packet Radio Service (GPRS) Enhancements for Evolved Universal Terrestrial Radio Access Network (E-UTRAN) Access," the disclosure of which is incorporated by reference herein in its entirety, describes general principles for Cellular IoT (C-IoT) optimizations, an optimization with which one or more illustrative embodiments will be described below. However, while illustrative embodiments are well-suited for implementation associated with the above-mentioned 5G-related 3GPP standards, alternative embodiments are not necessarily intended to be limited to any particular standards.

Furthermore, illustrative embodiments may be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to control plane message management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used in other embodiments to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and, more particularly, supports C-IoT optimization as mentioned above and as will be further explained herein. In such embodiments when the UE is an IoT device, non-limiting examples of such devices may include sensors, monitors, actuators, robotic devices and/or other machine-based devices. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

While illustrative embodiments will be described below from the perspective of control plane communications between the UE and the AMF in a 5G system environment, it is to be understood that control plane message management techniques described herein can be applied in a straightforward manner to communication systems other than 5G systems, by way of example only, LTE or other 3GPP systems, as well as any appropriate non 3GPP systems. By way of example only, in an alternative embodiment, where the communication system is an LTE system, the mobility management function is performed by a Mobility Management Entity (MME).

Returning to FIG. 1, AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), and Policy Control Function (PCF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane typically carries network user traffic (user data) while the control plane (CP) typically carries control signaling traffic (control data). SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between network functions (NFs) and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
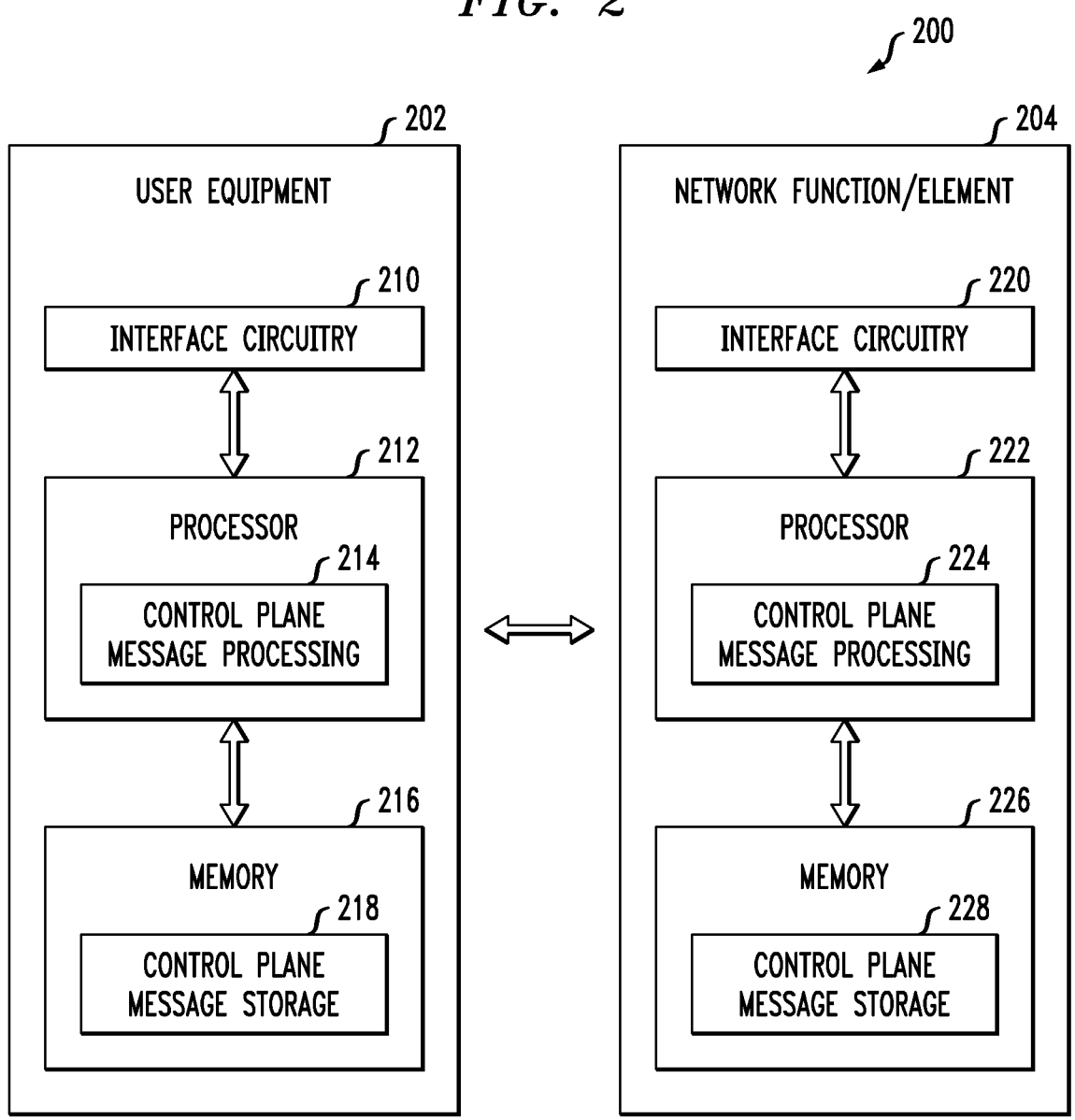
FIG. 2 illustrates processing architectures for user equipment and a network function/element with which one or more illustrative embodiments are implemented.

Illustrative embodiments provide improved techniques for control plane message management, particularly involving C-IoT optimizations. FIG. 2 is a block diagram of processing architectures 200 of two participants, i.e., user equipment and a network function/element (e.g., AMF), in a control plane message management methodology in an illustrative embodiment. It is to be appreciated that more than two participants may be involved in control plane message management according to illustrative embodiments. As such, FIG. 2 illustrates processing architectures associated with any two of the participants that directly and/or indirectly communicate. Therefore, in illustrative embodiments, each participant in a control plane message management methodology is understood to be configured with the processing architecture shown in FIG. 2.

As shown, user equipment 202 comprises a processor 212 coupled to a memory 216 and interface circuitry 210. The processor 212 of the user equipment 202 includes a control plane message processing module 214 that may be implemented at least in part in the form of software executed by the processor. The processing module 214 performs control plane message management, as well as other operations, described in conjunction with subsequent figures and otherwise herein. The memory 216 of the user equipment 202 includes a control plane message storage module 218 that stores data generated or otherwise used during control plane message management and other operations.

As further shown, a network function/element 204 comprises a processor 222 coupled to a memory 226 and interface circuitry 220. The processor 222 of the network function/element 204 includes a control plane message processing module 224 that may be implemented at least in part in the form of software executed by the processor 222. The processing module 224 performs control plane message management, as well as other operations, described in conjunction with subsequent figures and otherwise herein. The memory 226 of the network function/element 204 includes a control plane message storage module 228 that stores data generated or otherwise used during control plane message management and other operations.

The processors 212 and 222 of the respective user equipment 202 and network function/element 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective user equipment 202 and network function/element 204 may be used to store one or more software programs that are executed by the respective processors 212 and 222 to implement at least a portion of the functionality described herein. For example, control plane message management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective user equipment 202 and network function/element 204 illustratively comprise transceivers or other communication hardware or firmware that allows the associated system elements to communicate with one another in the manner described herein.

It is apparent from FIG. 2 that user equipment 202 is configured for communication with network function/element 204 and vice-versa via their respective interface circuitries 210 and 220. This communication involves user equipment 202 sending data to network function/element 204, and network function/element 204 sending data to user equipment 202. However, in alternative embodiments, other network elements or other components may be operatively coupled between, as well as to, user equipment 202 and/or network function/element 204. The term "data" as used herein is intended to be construed broadly, so as to encompass any type of information that may be sent between control plane message management participants including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Given the above illustrative architectures, illustrative embodiments of control plane message management methodologies will be further described below in the context of the C-IoT optimization features in 3GPP networks.

As mentioned above, general principles of C-IoT optimizations are described in the above-referenced TS 23.401 (e.g., clause 4.10: Introduction of C-IoT Evolved Packet System (EPS) Optimizations). Two types of communication bearer optimizations are specified. One optimization is based on User Plane (UP) transport of user data and is referred to as UP C-IoT EPS optimization. Another optimization, known as Control Plane (CP) C-IoT EPS optimization, transports user data or Short Message Service (SMS) messages via the mobility management element (MME in LTE or AMF in 5G) by encapsulating them in the Non-Access Stratum (NAS), reducing the total number of control plane messages when handling a short data transaction. NAS is the functional layer in UMTS and LTE wireless telecom protocol stacks between the core network and user equipment. This layer is used to manage the establishment of communication sessions and to maintain continuous communications with the user equipment as it roams.

When the UE attaches to the network, the UE includes, in a preferred network behavior indication, the network behavior that the UE can support and what it would prefer to use, such as whether CP C-IoT EPS optimization is supported or whether UP C-IoT EPS optimization is supported.

When CP C-IoT EPS optimization is supported, C-IoT UEs can send and receive small data packets over the NAS signalling control plane. There are some benefits when the C-IoT UEs uses the control plane for communication since the control plane is not busy all the time and has a relatively low rate of packets.

However, when a massive number of UEs are connected to the network (e.g., in some projections it is expected that a trillion IoT devices can be connected), the CP C-IoT optimization may interfere with the regular control plane signalling messages and cause delay to the control plane messages. This delay will affect network performance and can cause a network crash (failure) due to the non-processing of control messages at the appropriate times. Accordingly, it is realized that there is a need to mitigate such delays.

Illustrative embodiments provide a solution to the above and other problems by separating control messages and data packets over the NAS link between the UE and the MME in the LTE network and the UE and AMF in the 5G network.

Figure 3:
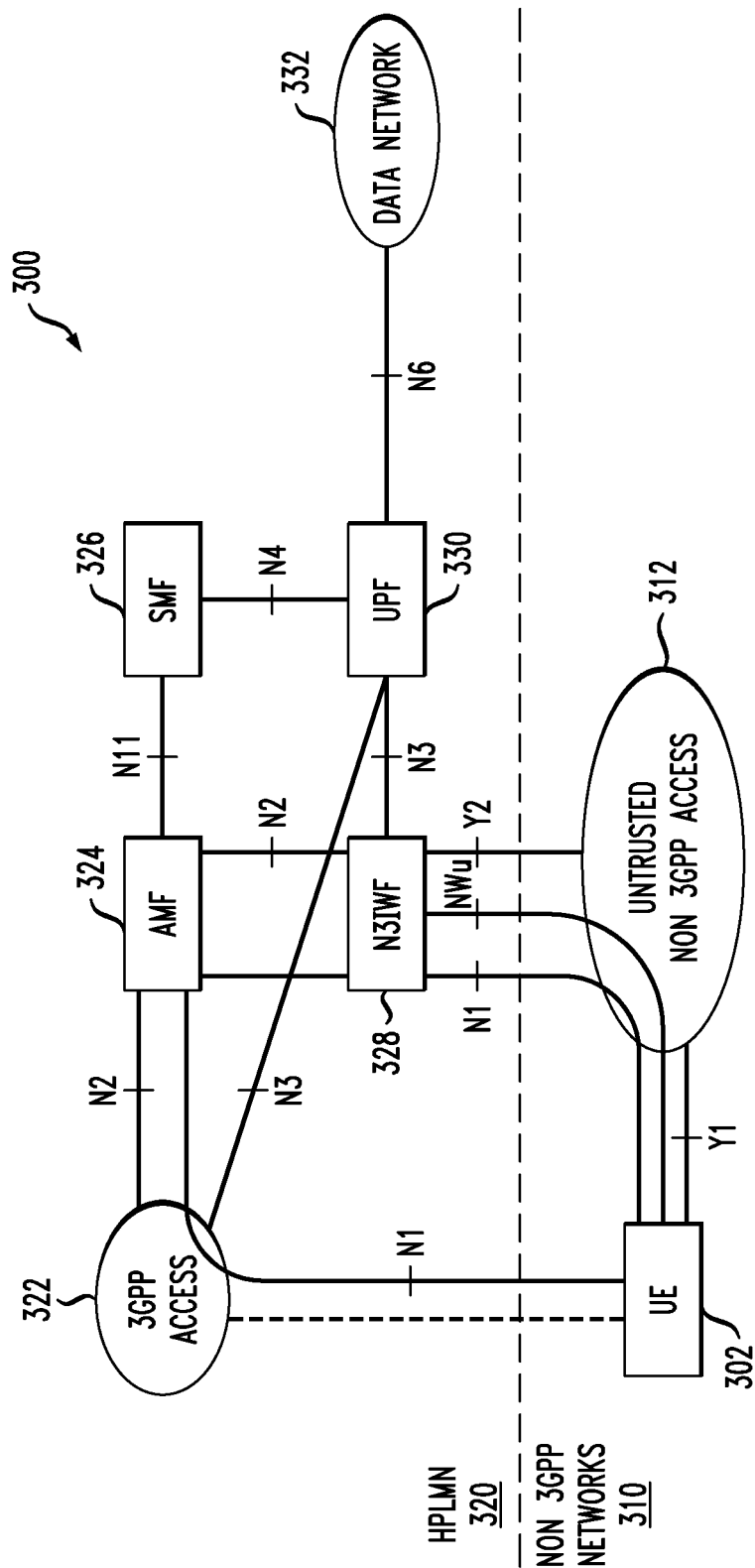
FIG. 3 illustrates part of a communication system, with which one or more illustrative embodiments are implemented, where user equipment connects to the communication system simultaneously over 3GPP access and non 3GPP access.

In one example embodiment, consider the scenario where a 5G UE is connected to a 5G network simultaneously over 3GPP access and non 3GPP access. FIG. 3 depicts this scenario. Note that, in some embodiments, 3GPP access is considered access through a wireless public network and non 3GPP access is considered access through a wireless private network.

More particularly, FIG. 3 illustrates part of a communication system 300 where a UE 302 connects to its HPLMN 320 simultaneously over 3GPP access 322 (e.g., gNB) and non 3GPP access 312 (e.g., a Wi-Fi transceiver). Note that the UE 302 may be connecting to the HPLMN 320 through a visited or serving network which can be the non 3GPP network 310 or another 3GPP network such as a VPLMN (not shown). Regardless, it is assumed that the non 3GPP network(s) 310 in this case is untrusted. FIG. 3 depicts the various interfaces (N1, Y1, etc.) used to make the connections. 3GPP access for UE 302 is made through AMF 324, while non 3GPP access for UE 302 is made through Non 3GPP Interworking Function (N3IWF) 328. N3IWF 328 connects to UPF 330, while AMF 324 connects to UPF 330 through SMF 326. UPF 330 connects with Data Network 332.

Assume that UE 302 is a C-IoT device. By way of example only, assume an IoT scenario that involves C-IoT devices in a factory setting, e.g., robotic devices operating on a factory floor that are also configured as UEs. Such a robotic device may connect to HPLMN 320 via non 3GPP access 312 as well as via 3GPP access 322. Since the robotic device may perform critical functions in the factory, often in cooperation with other robotic devices and other types of devices in the factory network, it is important to ensure sufficient network performance.

Thus, as mentioned above, assuming that the CP C-IoT EPS optimization is supported, a large number of C-IoT devices using the CP C-IoT EPS optimization will likely delay critical NAS control plane messages while the small user packet data is being transferred. For example, in such a delay scenario, NAS messages would get queued and not processed at the appropriate times because of the CP small data transmissions.

Note that this delay can occur in both the uplink (UL) direction (i.e., data traffic going from the UE to the network) and the downlink (DL) direction (i.e., data traffic going from the network to the UE). The problem is further defined as follows:

Assume a number, N, of C-IoT data units (e.g., packets) need to be delivered and each unit is contained in a NAS message that has the NAS COUNT 1 to N assigned and has been security protected. Then, assume an NAS signalling message has to be sent.

Without any optimizations, only a NAS COUNT=N+1 can be allocated for this NAS signalling message. This means that this message is queued and can only be delivered after the C-IoT data with NAS COUNT=N has been successfully transferred.

Given that an NAS timer for C-IoT has an extension value of 240 seconds (mobility management (MM) NAS messages) and 180 seconds (session management (SM) NAS messages), respectively, the waiting-time of delivery of the NAS signalling message can be significant. This will create problems for the regular NAS control messages.

Furthermore, consider that TS 33.501 states:

When the UE is registered in a serving network over two types of access (e.g., 3GPP and non 3GPP), then the UE has two active NAS connections with the same AMF. A common 5G NAS security context is created during the registration procedure over the first access type.

In order to realize cryptographic separation and replay protection, the common NAS security-context shall have parameters specific to each NAS connection. The connection specific parameters include a pair of NAS COUNTs for UL and DL and unique NAS connection identifiers (access ids). The access id value of the unique NAS connection identifier is set to "0x01" for 3GPP access and set to "0x02" for non 3GPP access.

In mobility and interworking scenarios, a newly created partial NAS security context is activated only on the NAS connection reporting the mobility, NAS security context is enabled one by one for multiple connections.

When the UE is simultaneously registered over both types of accesses, and if NAS key re-keying as described in TS 33.501 clause 6.9.4.2 or NAS key refresh as described in TS 33.501 clause 6.9.4.3 takes place over one of the accesses (e.g., access A), then the new NAS security context is only be activated over that access (access A). The UE and the AMF retains and continues to use the old NAS security context over the other access (e.g., access B). In order to activate the new NAS security context over the other access (access B), the AMF triggers a NAS SMC (security mode command) run over that access. During the second NAS SMC run (on access B), the AMF includes the same ngKSI (key set identifier in 5G) associated with the new NAS security context. After a successful second NAS SMC procedure over the other access (access B), both the UE and the AMF delete the old NAS security context.

Illustrative embodiments overcome this and other problems by separating the NAS signalling message and the C-IoT data transfer with different NAS COUNTs (i.e., different (unique) cryptographic streams) so that the NAS signalling message can be delivered independently. Thus, the NAS control plane messages are not delayed by the small user data transmissions of the CP C-IoT optimization.

As explained above, currently when a UE registers over multiple access types such as 3GPP and untrusted non 3GPP access, separate 'access id' values are used to distinguish the connection and the corresponding security context specific to that connection. This 'access id' parameter contributes to the key stream separation between the NAS link over 3GPP access and non 3GPP access.

Illustrative embodiments advantageously further distinguish the NAS link when the link carries user data packets from when it carries purely control data packets. That is, the access (connection) id parameter is used to create multiple bearer (channel or connection) types over the NAS link.

Based on this approach, CP optimized C-IoT devices, when connected to a 5G system, send pure CP messages over NAS using access id=0x01 when connected over 3GPP access and using access id=0x02 when connected over non 3GPP access. However, when the CP optimized C-IoT device sends UP data packets over the NAS link, the device uses access id =0x03 when connected over 3GPP access and access id=0x04 when connected over non 3GPP access. Separate quality-of-service (QoS) profile and buffer and data characteristics may be applied for each of these NAS bearers identified by the access id parameter. The approach is depicted in FIGS. 4 and 5.

Figure 4:
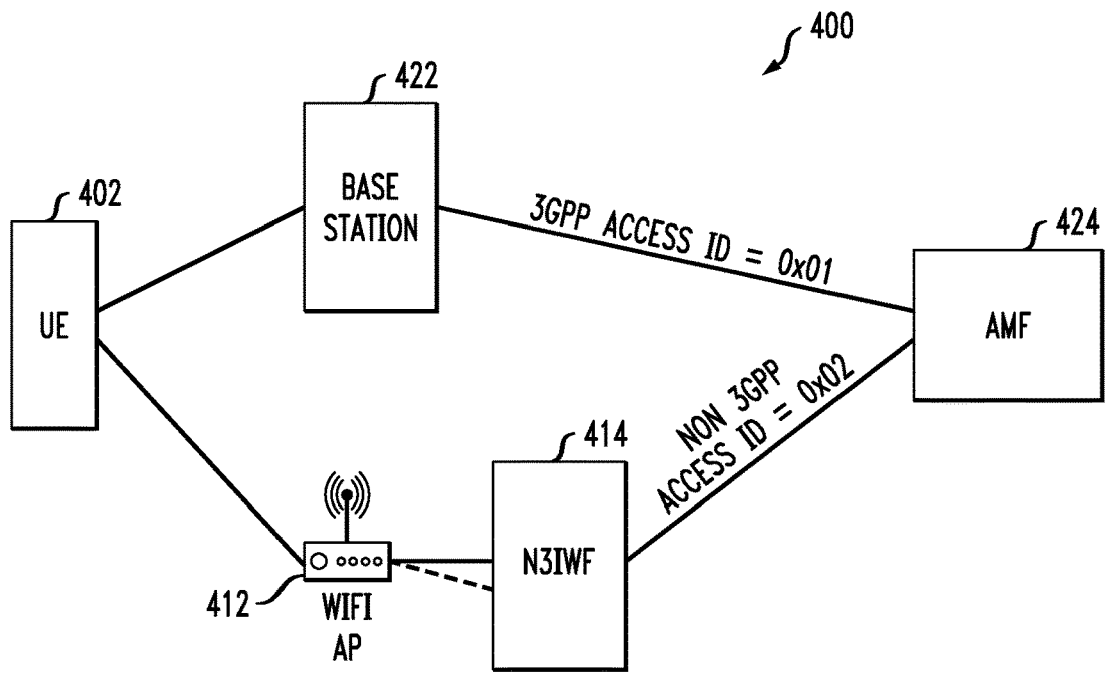
FIG. 4 illustrates part of a communication system, with which one or more illustrative embodiments are implemented, wherein access identifiers are used to differentiate user equipment connection to the communication system over 3GPP access and non 3GPP access.

More particularly, FIG. 4 illustrates a process 400 whereby the UE's access over 3GPP access and non 3GPP access to the AMF is differentiated. In illustrative embodiments, UE 402 is a CP optimized C-IoT device. As shown, similar to the connectivity depicted in FIG. 3, UE 402 is operatively coupled to a Wi-Fi transceiver 412 (non 3GPP access) which is operatively coupled to N3IWF 414. UE 402 is also operatively coupled to base station 422 (3GPP access). N3IWF 414 and base station 422 are operatively coupled to AMF 424. As further shown, UE 402 sends pure CP messages (i.e., only control plane signalling messages) over NAS using access id=001 when connected over 3GPP access (through base station 422) and using access id=002 when connected over non 3GPP access (through N3IWF 414).

Figure 5:
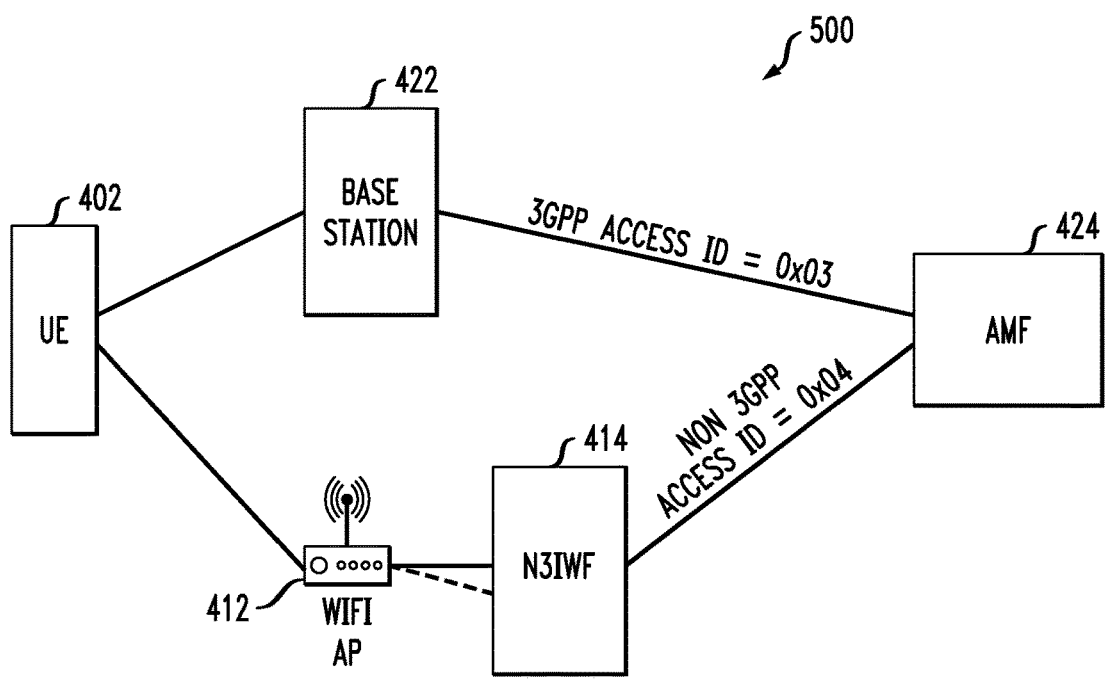
FIG. 5 illustrates part of a communication system using access identifiers to differentiate control plane messages from user equipment connected to the communication system over 3GPP access and non 3GPP access, according to an illustrative embodiment.

Turning now to FIG. 5, process 500 illustrates differentiation of the UE's access when user data is sent over 3GPP access and non 3GPP access. More particularly, as shown, when UE 402 sends user data packets over the NAS link (e.g., as per the CP C-IoT EPS optimization feature described herein), the device uses access id=003 when connected over 3GPP access and access id=004 when connected over non 3GPP access.

Advantageously, control data transfer and user data transfer are separated with different NAS COUNTs (i.e., different (unique) cryptographic bearer streams) so that the NAS signalling message can be delivered independently and not be delayed by the user data transmissions of the CP C-IoT optimization.

Figure 6A:
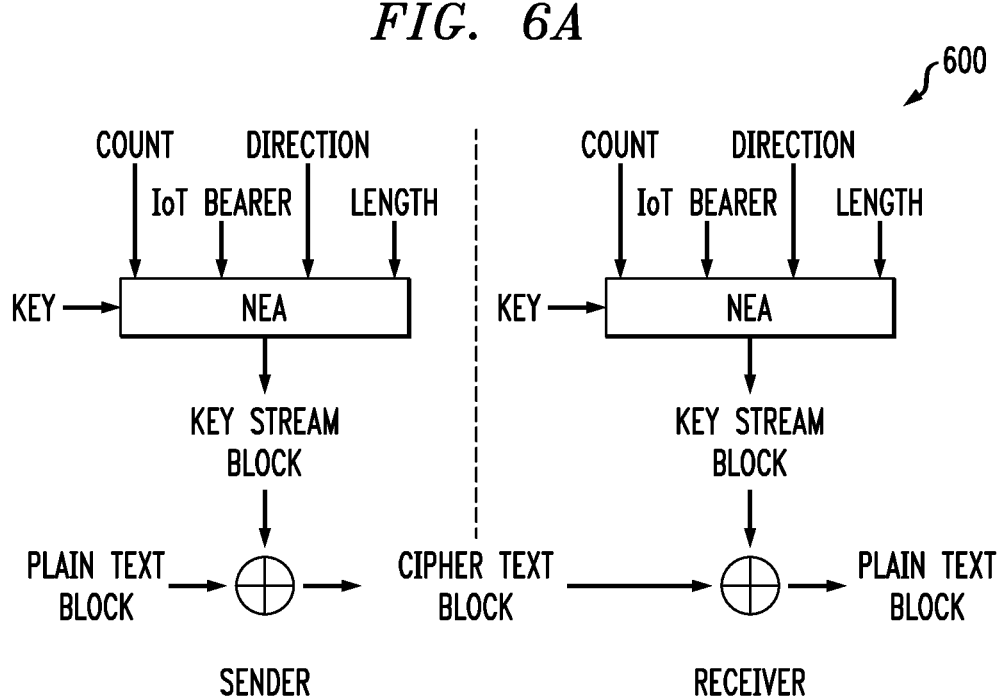
FIGS. 6A and 6B illustrate key stream separation using the access identifiers in FIG. 5.
Figure 6B:
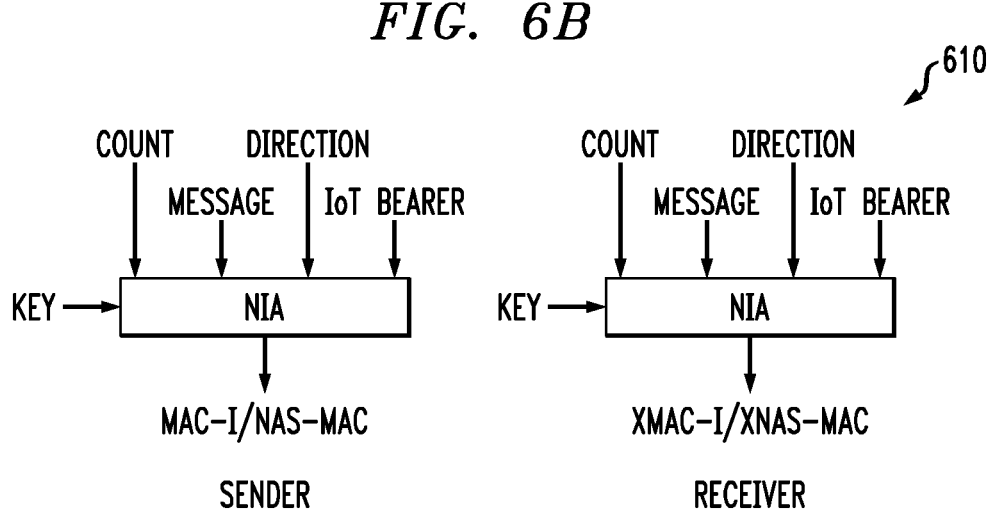

FIGS. 6A and 6B illustrate key stream separation using the access identifiers in FIG. 5. More particularly, process 600 in FIG. 6A illustrates ciphering of data as per the above-referenced TS 33.501 (see FIG. D.2.1.1.1), while process 610 in FIG. 6B illustrates derivation of MAC-I/NAS-MAC (or XMAC-I/XNAS-MAC) where MAC refers to a message authentication code (see FIG. D.3.1.1.1). Specific descriptions of these particular key operations are further described in the above-referenced TS 33.501 and related documents and are not described in detail herein.

More particularly, note that in each of processes 600 and 610, a given C-IoT device (UE) uses a different NAS bearer (access) id value (IoT BEARER) for key stream separation, e.g.: NAS bearer id=001 for control data over 3GPP access, NAS bearer id=002 for control data over non 3GPP access, NAS bearer id=003 for user data over 3GPP access, and NAS bearer id=0x04 for user data over non 3GPP access. It is to be understood that, in alternative embodiments, different access id values than those depicted above can be used to differentiate user data from control data and 3GPP access from non 3GPP access over the NAS links.

Note that since control plane packets from a UE go over the currently defined access id, clause A.9 in TS 33.501 will have no impact, because of the new access id values. The KgNB (key of gNB) and KN3IWF (key of N3IWF) derivation for CP optimized IoT devices use the same set of input values for 3GPP access and non 3GPP access, because even for CP optimized IoT devices, they will have to send NAS control messages and they will use these existing values.

Thus, in accordance with illustrative embodiments, each CP optimized IoT device has multiple NAS access ids, i.e., one or more access ids for sending control packets and one or more access ids for sending user data packets. Note that distinct access ids are used for user data and control data whether or not different access methods (3GPP and non 3GPP) are used.

FIG. 7 illustrates a control plane message management methodology 700, according to an illustrative embodiment. As shown, in step 702, the method comprises transmitting control data over a control plane associated with a communication system using a first access identifier value. In step 704, the method comprises transmitting user data over the control plane using a second access identifier value. The first access identifier value is distinct from the second access identifier value.

It is realized herein that other access types such as cable, or direct line access may get added to the communication system in future. These additional access types to MME or AMF in the example network may aggravate the congestion over the control path discussed earlier, if control data packets and user data packets are mixed on the NAS signaling link. In all such scenarios, separation of the control data and user data packets using different access identifier values can provide key stream separation and practical solutions to mitigate the processing delay. Thus, illustrative embodiments support implementation of the separation techniques described herein for access types alternative to, and in addition to, 3GPP access and/or non 3GPP access.

In a further embodiment of methodology 700 the method may further comprise: transmitting the control data over the control plane using the first access identifier value for one of a first access type and a second access type; transmitting the control data over the control plane using a third access identifier value for the other of the first access type and the second access type; transmitting the user data over the control plane using the second access identifier value for one of the first access type and the second access type; and transmitting the user data over the control plane using a fourth access identifier value for the other of the first access type and the second access type. The first, second, third and fourth access identifier values are distinct with respect to one another.

The particular processing operations and other system functionality described in conjunction with diagrams of FIGS. 1-7 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, authentication and key agreement protocols, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;

at least one memory including computer program code;
the at least one memory and the computer program code being configured to, with the at least one processor, cause the apparatus at least to:
  transmit control data, over a control plane associated with a communication system via a first link, using a first access identifier value; and
  transmit user data, over the control plane via the first link, using a second access identifier value;
  wherein the first access identifier value is distinct from the second access identifier value,
  wherein the first access identifier value and the second access identifier value are used for key stream separation, and wherein the first access identifier value is associated with a non-access stratum (NAS) bearer identifier value for key stream separation over a 3GPP access network and wherein the second access access identifier value is associated with an NAS bearer identifier value for key stream separation over a non-3GPP access network, and
  wherein a different quality of service (QoS) profile, buffer and data characteristics are utilized for a first NAS bearer associated with the first access identifier than the QoS profile, buffer and data characteristics for a second NAS bearer associated with the second access identifier, and
  wherein the transmission of data over the first NAS bearer is not delayed by transmission of data over the second NAS bearer.

2. The apparatus of claim 1, wherein the at least one memory and the computer program code are further configured to, with the at least one processor, cause the apparatus at least to:
  transmit the control data over the control plane using the first access identifier value for one of a first access type and a second access type;
  transmit the control data over the control plane using a third access identifier value for the other of the first access type and the second access type;
  transmit the user data over the control plane using the second access identifier value for one of the first access type and the second access type; and
  transmit the user data over the control plane using a fourth access identifier value for the other of the first access type and the second access type;
  wherein the first, second, third and fourth access identifier values are distinct with respect to one another.

3. The apparatus of claim 1, wherein the first access type comprises 3GPP access and the second access type comprises non 3GPP access.

4. The apparatus of claim 3, wherein the non 3GPP access is untrusted.

5. The apparatus of claim 1, wherein the control plane comprises a (NAS) nonaccess stratum link.

6. The apparatus of claim 5, wherein the first access identifier value and the second access identifier are unique NAS bearer identifier values.

7. The apparatus of claim 1, wherein the apparatus is part of user equipment.

8. The apparatus of claim 7, wherein the user equipment is part of an Internet of Things (IoT) device.

9. The apparatus of claim 7, wherein the transmit steps are part of an uplink from the user equipment to a network entity of the communication system.

10. The apparatus of claim 1, wherein the apparatus is part of a network entity of the communication system.

11. The apparatus of claim 10, wherein the transmit steps are part of a downlink from the network entity to user equipment accessing the communication system.

12. The apparatus of claim 1, wherein each transmit step further comprises using the corresponding access identifier to generate a unique cryptographic stream to secure the data being transmitted.

13. The apparatus of claim 1, wherein the transmit steps are part of a control plane optimization feature associated with the communication system.

14. A method comprising:
  transmitting control data, over a control plane associated with a communication system via a first link, using a first access identifier value; and
  transmitting user data, over the control plane via the first link, using a second access identifier value;
  wherein the first access identifier value is distinct from the second access identifier value,
  wherein the first access identifier value and the second access identifier value are used for key stream separation, and wherein the first access identifier value is associated with a non-access stratum (NAS) bearer identifier value for key stream separation over a 3GPP access network and wherein the second access access identifier value is associated with an NAS bearer identifier value for key stream separation over a non-3GPP access network, and
  wherein a different quality of service (QoS) profile, buffer and data characteristics are utilized for a first NAS bearer associated with the first access identifier than the QoS profile, buffer and data characteristics for a second NAS bearer associated with the second access identifier, and
  wherein the transmission of data over the first NAS bearer is not delayed by transmission of data over the second NAS bearer.

15. The method of claim 14, further comprising:
  transmitting the control data over the control plane using the first access identifier value for one of a first access type and a second access type;
  transmitting the control data over the control plane using a third access identifier value for the other of the first access type and the second access type;
  transmitting the user data over the control plane using the second access identifier value for one of the first access type and the second access type; and
  transmitting the user data over the control plane using a fourth access identifier value for the other of the first access type and the second access type;
  wherein the first, second, third and fourth access identifier values are distinct with respect to one another.

16. The method of claim 14, wherein the first access type comprises 3GPP access and the second access type comprises non 3GPP access.

17. The method of claim 16, wherein the non 3GPP access is untrusted.

18. The method of claim 14, wherein the control plane comprises a (NAS) non-access stratum link.

19. The method of claim 18, wherein the first access identifier value and the second access identifier are unique NAS bearer identifier values.

20. The method of claim 14, wherein the apparatus is part of user equipment.

21. The method of claim 20, wherein the user equipment is part of an Internet of Things (IoT) device.

22. The method of claim 20, wherein the transmit steps are part of an uplink from the user equipment to a network entity of the communication system.

23. The method of claim 14, wherein the apparatus is part of a network entity of the communication system.

24. The method of claim 23, wherein the transmit steps are part of a downlink from the network entity to user equipment accessing the communication system.

25. The method of claim 14, wherein each transmit step further comprises using the corresponding access identifier to generate a unique cryptographic stream to secure the data being transmitted.

26. The method of claim 14, wherein the transmit steps are part of a control plane optimization feature associated with the communication system.

27. An article of manufacture comprising a non-transitory computer readable storage medium having embodied therein executable program code that when executed by a processor operatively coupled to the computer-readable storage medium cause the processor to perform steps of:
transmitting control data, over a control plane associated with a communication system via a first link, using a first access identifier value; and
transmitting user data, over the control plane via the first link, using a second access identifier value;
wherein the first access identifier value is distinct from the second access identifier value,
wherein the first access identifier value and the second access identifier value are used for key stream separation, and wherein the first access identifier value is associated with a non-access stratum (NAS) bearer identifier value for key stream separation over a 3GPP access network and wherein the second access access identifier value is associated with an NAS bearer identifier value for key stream separation over a non-3GPP access network, and
wherein a different quality of service (QoS) profile, buffer and data characteristics are utilized for a first NAS bearer associated with the first access identifier than the QoS profile, buffer and data characteristics for a second NAS bearer associated with the second access identifier, and
wherein the transmission of data over the first NAS bearer is not delayed by transmission of data over the second NAS bearer.

28. The article of claim 27, wherein the steps further comprise:
transmitting the control data over the control plane using the first access identifier value for one of a first access type and a second access type;
transmitting the control data over the control plane using a third access identifier value for the other of the first access type and the second access type;
transmitting the user data over the control plane using the second access identifier value for one of the first access type and the second access type; and
transmitting the user data over the control plane using a fourth access identifier value for the other of the first access type and the second access type;
wherein the first, second, third and fourth access identifier values are distinct with respect to one another.

29. The article of claim 27, wherein the first access type comprises 3GPP access and the second access type comprises non 3GPP access.

30. The article of claim 27, wherein the control plane comprises a (NAS) nonaccess stratum link.

* * * * *